C. H. TUCKER.
LOAD BRAKE FOR CRANES AND HOISTS.
APPLICATION FILED FEB. 16, 1910.
1,031,302.
Patented July 2, 1912.
2 SHEETS—SHEET 1.
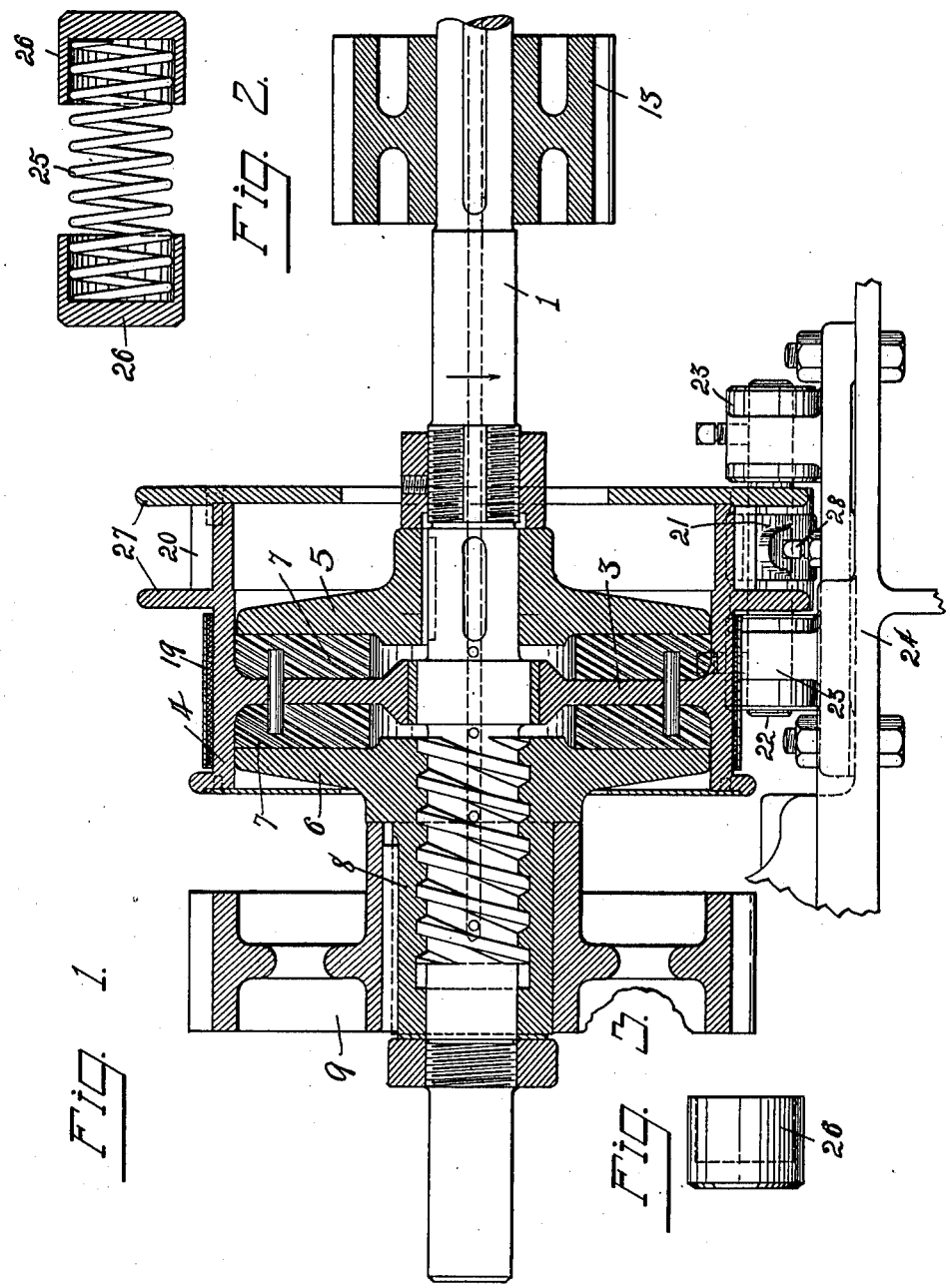

C. H. TUCKER.
LOAD BRAKE FOR CRANES AND HOISTS.
APPLICATION FILED FEB. 16, 1910.
1,031,302.
Patented July 2, 1912.
2 SHEETS—SHEET 2.
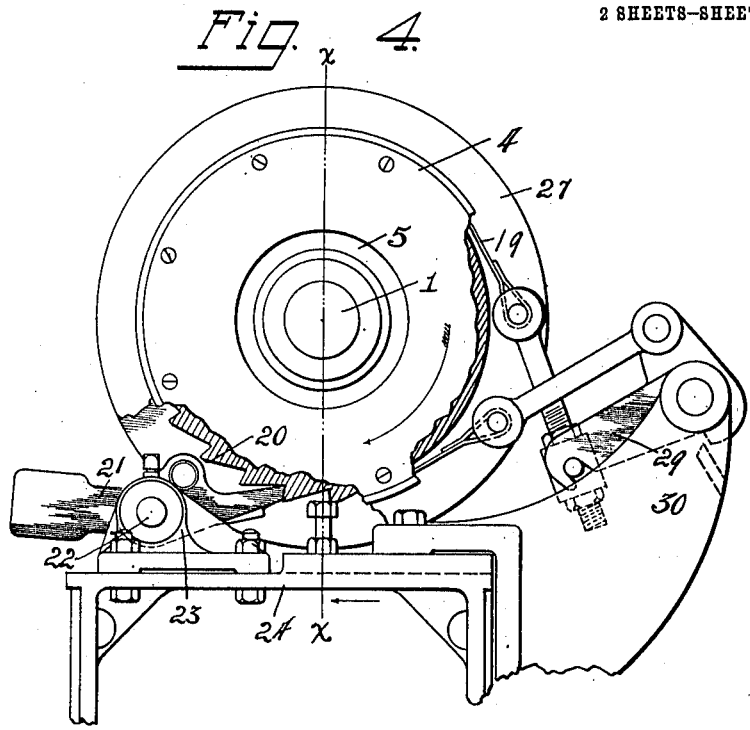
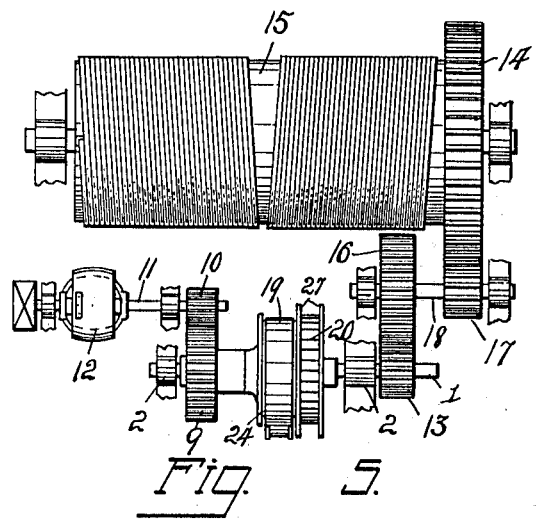
WITNESSES:
C. H. Bills.
Eugene Schreiber
INVENTOR.
Charles H. Tucker,
By Owen & Owen,
His attys.

UNITED STATES PATENT OFFICE.

CHARLES H. TUCKER, OF TOLEDO, OHIO.

LOAD-BRAKE FOR CRANES AND HOISTS.

1,031,302.  Specification of Letters Patent.  Patented July 2, 1912.

Application filed February 16, 1910. Serial No. 544,235.

*To all whom it may concern:*

Be it known that I, CHARLES H. TUCKER, a citizen of the United States, and a resident of Toledo, in the county of Lucas and State of Ohio, have invented a certain new and useful Load-Brake for Cranes and Hoists; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to hoisting apparatus, and has particular reference to an improved construction of load brake for such apparatus, but is not restricted to such use as it may be used in any connection for which it may be adapted or appropriate.

It has heretofore been customary in machines of this class to employ either a friction band brake or one of the pawl and ratchet type. The pawl and ratchet system is faulty, however, as it has been proven that it will not stand up to service requirements, and that the cost of up keep of the same is considerably more than that of the flexible band type of brake. For these reasons recent heavy crane users, such as steel plants or the like, have gone back to the flexible band type of brake, except in cases where hot metals or other materials are being handled, for if the band should break serious accidents would very likely follow.

The object of my invention is the provision of a load brake mechanism which combines the advantages of both types of brakes, thus overcoming the objections incident to the use of either form singly, and which is simple, efficient and inexpensive of operation and maintenance.

The invention is fully described in the following specification, and a preferred embodiment of the same illustrated in the accompanying drawings, in which—

Figure 1 is a central longitudinal section of the mechanism embodying my invention taken on the line $x$—$x$ in Fig. 4. Fig. 2 is an enlarged side view of the pawl friction means, with the end caps in section. Fig. 3 is a side view of one of such caps. Fig. 4 is an end elevation of the brake mechanism with portions broken away, and Fig. 5 is a diagrammatical plan view of the brake mechanism and associated operative parts.

Referring to the drawings, 1 designates a shaft, which is mounted in suitable bearings, as 2 Fig. 5, and loosely carries the disk or web 3 of a drum 4. A friction disk 5 is fixed to the shaft 1 within the peripheral portion of the drum at one side of the web 3 thereof, and a similar disk 6 is threaded to the shaft at the opposite side of the web 3, as indicated in Fig. 1. It is evident with this construction that on a turning of the disk 6 in one direction relative to the shaft 1, or a turning of such shaft in the opposite direction relative to the disk, will tend to move the disk 6 toward the companion disk 5 and to cause it to coöperate with such disk to frictionally grip the web portion 3 of the drum, which portion is shown as being faced with gripping pieces 7. The disk 6 has its hub extended in opposition to the web 3 to form a sleeve 8 upon which a gear or pinion 9 is keyed. This gear is shown in Fig. 5 as meshing with a pinion 10 on the motor shaft 11 of a motor 12 or other suitable power means. Mounted on the opposite end of the shaft 1 to the gear 9 is a pinion 13, which is shown in Fig. 5 as adapted to communicate rotation to the gear 14 of a cable-drum 15 through the medium of the reducing gears or pinions 16, 17 on the shaft 18.

To carry out the feature of my invention I encircle an annular portion of the drum 4 with a differential brake-band 19 and provide another annular portion of the same with a series of ratchet-teeth 20 with which a pawl 21 is adapted to engage. This pawl is loosely mounted on a short shaft 22, the ends of which are mounted in bosses 23 rising from a subjacent frame 24. 25 designates a coiled compression spring on the ends of which are mounted thrust caps 26. This spring is projected through an aperture (not shown), which is provided in the pawl 21 in advance and above the pivot of the pawl or intermediate such pivot and the drum axis, and has its thrust-caps 26 frictionally bearing against annular flanges 27, 27 projecting peripherally from the drum 4 at opposite ends of the teeth 20. It is thus apparent with this arrangement that on a rotation of the drum in a direction opposed to its direction of engagement with the pawl, or in "load raising" direction, the frictional action of the flanges 27 on the spring thrust caps 26 will effect an automatic movement of the nose of the pawl 21 out of engaging position with the teeth 20, and, on a reverse or "load falling" rotation of the drum, will likewise act to automatically throw the nose of the pawl into engagement with the drum teeth, such action being augmented by the weighted outer end of the pawl. The releasing movement of the pawl is limited by the coaction of its hose with a stop-screw 28 on the frame 24. An automatic releasing and engaging action of the brake-band 19 with the drum 4, according to the direction of rotation of such drum, is effected by attaching the ends of the band to opposite ends of a bell-crank lever 29, which is fulcrumed to an adjacent frame part 30 and has one arm longer than the other. The action of this form of brake-band, which is known as a differential brake-band, is well understood in the art.

The operation of my invention is as follows:—On a starting of the motor to hoist a load, the friction disk 6 is actuated to turn on the threaded portion of the shaft in a direction to effect a clamping of the drum web 3 between the disks 5 and 6, thus causing the shaft 1, disks 5 and 6 and drum 4 to turn as a unit. On a stopping of the motor, the tendency of the load being to lower, causes the shaft 1 to turn in the direction indicated by the arrow, Fig. 1, which in turn tends to screw the disk 6 in the direction to lock the disks 5 and 6 and the drum web 3 together, and the whole is prevented from rotating in the lowering direction due to the brake band 19 and pawl 21 acting in conjunction on the drum to sustain the load. It is apparent that on a stopping of the motor the brake-band takes hold of the drum first and breaks the shock of engagement of the pawl and ratchet, and also coöperates with the pawl and ratchet to hold the load, while, should the band break, the pawl and ratchet act alone to support the load. The brake-band, which is usually of steel, lined with some good friction material as leather, canvas, camels-hair belting, wood, etc., is the most satisfactory method of holding the load brake, as there is just enough slip in the band to prevent any shock through the hoisting mechanism, but at the same time can never be entirely depended upon, as the band must be flexible and consequently thin and necessarily liable to break, thereby permitting the load to run away. On the other hand, the use of the pawl and ratchet is almost an absolutely safe proposition, but on account of its construction does not permit of any slip, and consequently always sets with a shock to the hoisting mechanism, which in time ruins the pawl or ratchet, or both, and necessitates considerable expense for repairs. In the conjoint use of these two brake means, the pawl and ratchet acts as an auxiliary to the band, which takes up the shock. The pawl and ratchet means, however, is an absolute safe guard against a running away of the load should the band break while the mechanism is in service, and the combination permits the operation of the machine while either the band or the pawl and ratchet means is undergoing repairs. To lower a load power must be applied by the motor to the sleeve 8 and disk 6 in the lowering direction, which screws the disks 5 and 6 apart and permits the shaft 1 to revolve in the lowering direction relative to the drum 4. On a stopping of the motor the brake immediately locks as above described.

I wish it understood that my invention is not limited to any specific construction or arrangement of the parts, except in so far as such limitations are specified in the claims.

Having thus described my invention, what I claim as new and desire to secure by Letters Patent, is,—

1. In a load-brake, the combination of a drum having an annular series of ratchet teeth thereon, a brake band for such drum, and a pawl operable to act in conjunction with said teeth to stop rotation of the drum in one direction, the band serving to prevent a sudden engagement of the pawl and teeth and both the brake-band and pawl being automatically operable to stop a rotation of the drum in the same direction.

2. In an apparatus of the class described, the combination of a drum having an annular series of ratchet teeth thereon, a brake-band for such drum and a pawl adapted to act in conjunction with said teeth to stop rotation of the drum in one direction, the band serving to prevent a sudden engagement of the pawl and teeth and both the brake-band and pawl being automatically operable to engage their respective drum parts and stop a rotation of the drum in one direction and automatically operable to release their respective drum parts upon a rotation of the drum in the opposite direction.

3. In a loadbrake, the combination of a rotatable member having an annular series of ratchet teeth thereon, a pawl for coacting with said teeth to stop a rotation of said member in one direction, and a brake-band for said member automatically operable to hold the member against rotation in the direction of engagement of the pawl and ratchet and to break the shock of engagement of said pawl and teeth, said pawl and brake-band being independently movable and the pawl being automatically moved to release said teeth upon a rotation of the member in one direction and to engage the teeth upon a rotation of the member in the opposite direction.

4. In a load brake, the combination of a drum having spaced peripheral flanges and an annular series of ratchet teeth between such flanges, a brake-band for the drum, a pawl for coöperating with said teeth to brake the drum, and means coöperating with said flanges to automatically throw the pawl into commission in one direction of rotation of the drum and out of commission in the other direction of rotation of the drum.

5. In a load brake, the combination of a drum having spaced peripheral flanges and an annular series of ratchet teeth between such flanges, a brake-band for the drum, a pawl capable of coöperating with said teeth to brake the drum, and a friction member associated with said pawl and having its opposite ends thrust against said flanges whereby to coöperate therewith to throw the pawl into commission in one direction of rotation of the drum and out of commission in the other direction of rotation of the drum.

In testimony whereof I have hereunto signed my name to this specification in the presence of two subscribing witnesses.

CHARLES H. TUCKER.

Witnesses:
E. E. THOMAS,
C. W. OWEN.

Copies of this patent may be obtained for five cents each, by addressing the "Commissioner of Patents, Washington, D. C."